(No Model.) 2 Sheets—Sheet 1.
T. P. RANDALL.
WAGON BRAKE.
No. 476,553. Patented June 7, 1892.
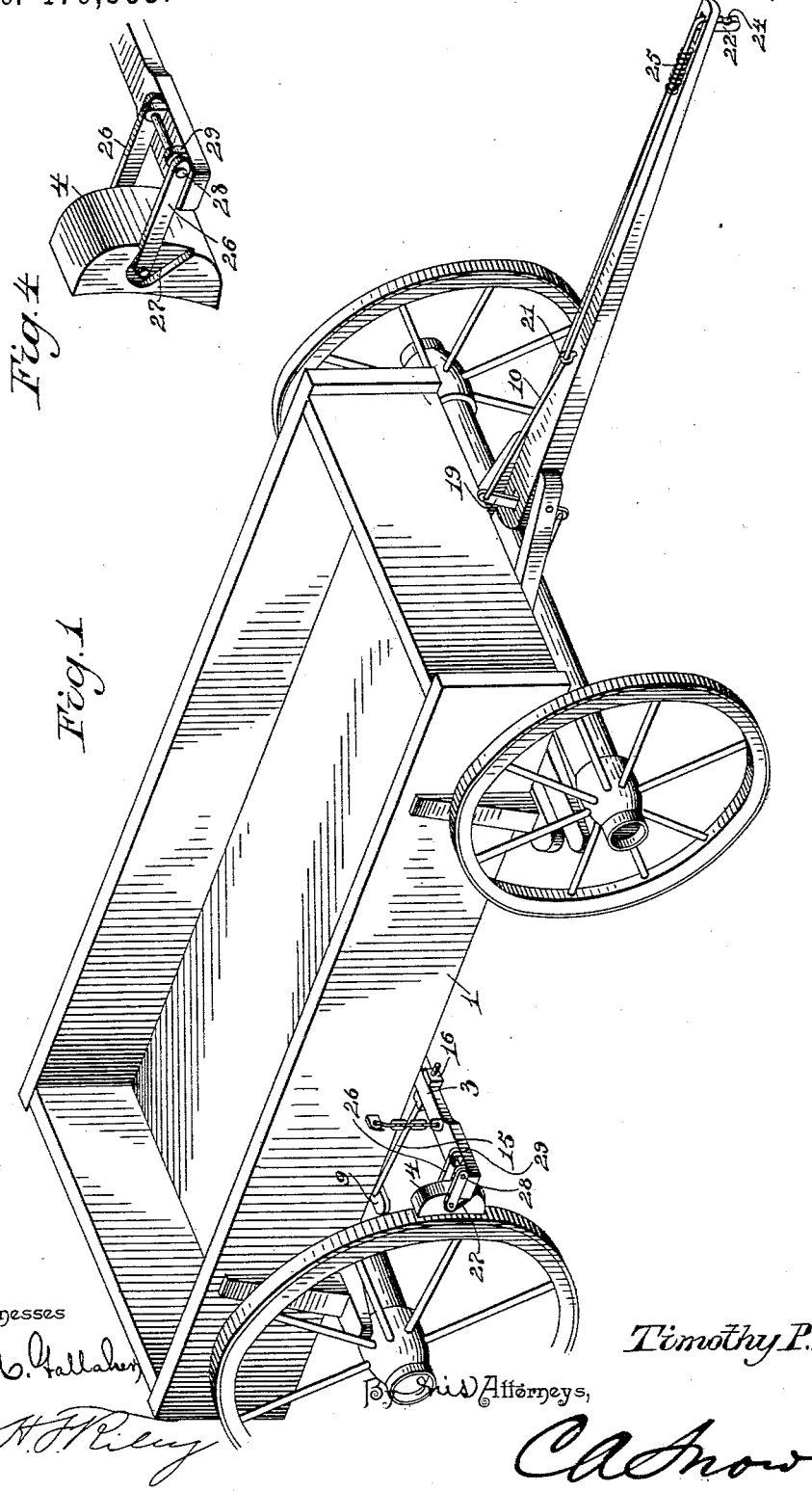
Witnesses
C. M. Gallaher
H. F. Riley
Inventor
Timothy P. Randall
By his Attorneys,
C. A. Snow & Co.

(No Model.) 2 Sheets—Sheet 2.
T. P. RANDALL.
WAGON BRAKE.
No. 476,553. Patented June 7, 1892.
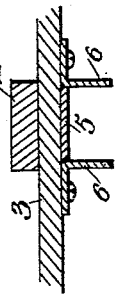
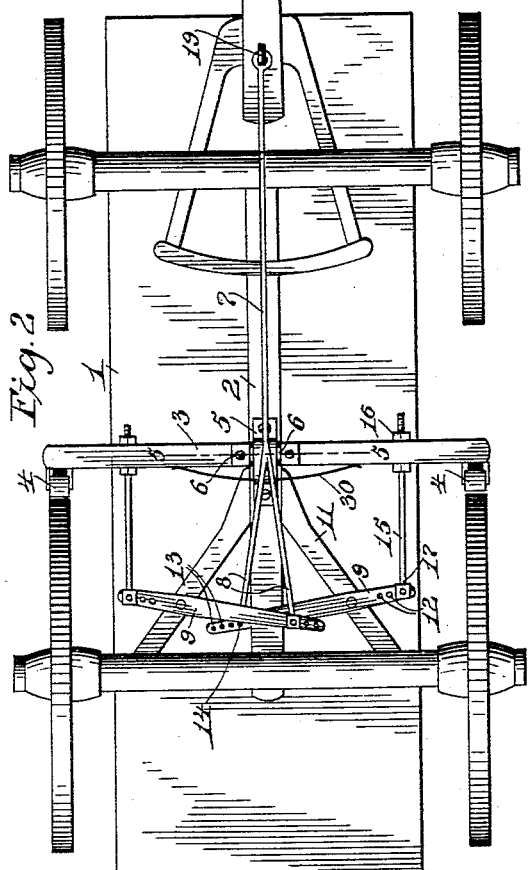
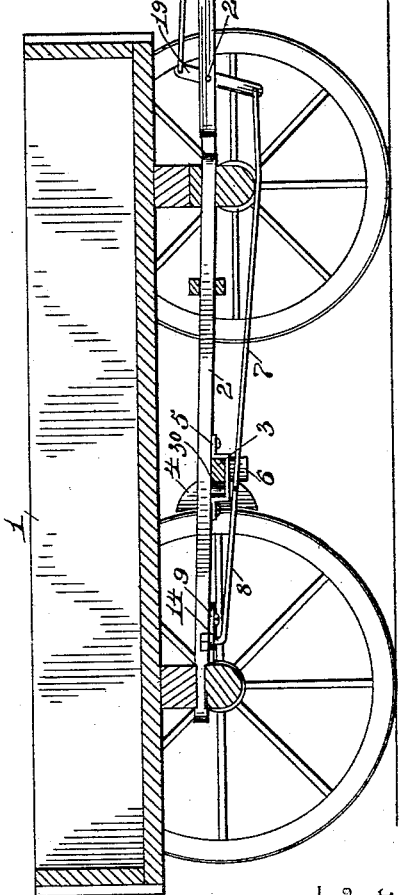
Witnesses
Inventor
Timothy P. Randall
By his Attorneys,

UNITED STATES PATENT OFFICE.

TIMOTHY P. RANDALL, OF ADRIAN, MICHIGAN, ASSIGNOR OF ONE-HALF TO GEORGE KASTLER, OF SAME PLACE.

WAGON-BRAKE.

SPECIFICATION forming part of Letters Patent No. 476,553, dated June 7, 1892.

Application filed March 4, 1891. Serial No. 383,750. (No model.)

*To all whom it may concern:*

Be it known that I, TIMOTHY P. RANDALL, a citizen of the United States, residing at Adrian, in the county of Lenawee and State of Michigan, have invented a new and useful Wagon-Brake, of which the following is a specification.

The invention relates to improvements in wagon-brakes.
The object of the present invention is to provide a simple and inexpensive automatic wagon-brake adapted to be automatically operated and capable of readily becoming disengaged from the wheels during backing.
The invention consists in the construction and novel combination and arrangement of parts hereinafter fully described, illustrated in the accompanying drawings, and pointed out in the claim hereto appended.
In the drawings, Figure 1 is a perspective view of a vehicle provided with a brake constructed in accordance with this invention. Fig. 2 is a reverse plan view. Fig. 3 is a longitudinal sectional view. Fig. 4 is a detail perspective view of one of the brake-blocks. Fig. 5 is a transverse section on the line 5 5 of Fig. 2.

Referring to the accompanying drawings, 1 designates a vehicle having sliding on its reach 2 a brake-bar 3, which is provided at its end with brake-blocks 4 and is arranged in a keeper 5 and has arranged on opposite sides of the keeper angle-plates 6, which are secured to the brake-bar and depend therefrom and prevent longitudinal movement of the same and form a guide for a connecting-rod 7, which is provided with rear diverging portions 8, and is secured with brake-levers 9 and with an operating-rod 10. The brake-levers are fulcrumed intermediate their ends on the rear hounds 11 and are provided at their ends with series of adjusting perforations 12 and 13, and the rear diverging portions 8 have their ends 14 bent at an angle, threaded and provided with nuts, and engaging the perforation 13 at the inner ends of the brake-levers and adapted to be adjusted to vary the leverage on the brake-bar. The outer ends of the brake-levers 9 are connected with the brake-bar by adjusting-rods 15, which have their front ends threaded and provided with adjusting-nuts 16, and their rear ends 17, bent at an angle, threaded and provided with nuts and engaging the outer ends of the brake-levers and adapted to be adjusted by means of perforations 12, and the distance between the outer ends of the levers and the brake-bar can be increased or diminished by means of the adjusting-nuts 16, which engage the threaded portions 18 of the adjusting-rods. The inner ends of the levers 9 are extended and they cross each other, and thereby greatly increase the leverage. By this construction it will be readily seen that the tension and leverage on the brake shoes or blocks 4 can be readily adjusted to the character of vehicles, load to be carried, or road to be traveled. The front end of the connecting-rod 7 is provided with an eye and is secured to the lower end of a lever 19, fulcrumed at the inner end of the tongue 20 and connected with the rear end of the operating-rod 10, and the latter is mounted in guides 21 on the upper face of the tongue and has its front end 22 bent downward and arranged in a slot 23 of the tongue and provided with a recess 24, adapted to be engaged by a neck-yoke to apply the brake. The depending end 22 is held at the forward end of a slot 23 by a spring 25, coiled around the operating-rod and having one end bearing against one of the guide-eyes 21 and its other end engaging the operating-rod. As soon as there is a strain upon the holdbacks the operating-rod 10 is forced backward and the brake is applied, and to prevent the brake operating while backing the vehicle the brake-shoes 4 are connected with the brake-bar by linked plates 26, which have each one end pivotally connected to the shoe and arranged in a recess 27 thereof, and the other end of the link-plate is pivotally connected to the brake-bar by a bolt 28, mounted in ears 29, arranged on the upper face of the brake-bar. When the vehicle is moving forward and the brake is applied, the brake-shoes engage the wheels and retard the motion of the same; but when the wheels are reversely rotating they lift the brake-shoes out of engagement and back freely. The brake-shoes are normally held out of engagement with the wheels by a flat spring 30, which has its end secured to the rear edge of the brake-bar and engages the keeper in which it is arranged at a point intermediate of its ends, forcing the brake-bar to the front end of the keeper.

It will readily be seen that the brake mechanism is simple and inexpensive in construction, adapted to be readily applied to any character of vehicles, and is capable of automatically operating without interfering with the backing of a vehicle.

Instead of arranging the operating-rod along a tongue, it may be arranged on a pair of thills and be connected with the holdbacks; and I desire it to be understood that I do not limit myself to the precise details of construction herein described, as I may without departing from the spirit of my invention make minor changes therein.

The slope of the recess 27 is important in holding the brake-bar from turning on its pivot too far in either direction. The upper wall of the recess is substantially horizontal, while the lower wall is inclined.

What I claim is—

The combination of a running-gear having a tongue provided at its outer end with a vertical slot, a brake-bar, brake-shoes arranged at the ends of the brake-bar and provided in their sides with triangular recesses, link-plates pivoted in the recesses and connected to the brake-bar, brake-levers connected with the brake-bar, the tongue-rod connected with the brake-levers and having its front end bent downward and arranged in said slot and provided with a recess, and a spring arranged on the tongue-rod, substantially as described.

In testimony that I claim the foregoing as my own I have hereto affixed my signature in presence of witnesses.

TIMOTHY P. RANDALL.

Witnesses:
LEWIS T. LOCHNER,
GEORGE A. TREAT.